Nov. 16, 1943.   W. B. CONNOLLY   2,334,543
ELECTRICAL MECHANISM FOR REMOTE INDICATION OF MOVEMENT

Filed Nov. 30, 1942

INVENTOR.
William B. Connolly
BY Harold E. Stonebraker
ATTORNEY.

Patented Nov. 16, 1943

2,334,543

UNITED STATES PATENT OFFICE 2,334,543

ELECTRICAL MECHANISM FOR REMOTE INDICATION OF MOVEMENT

William B. Connolly, Rochester, N. Y., assignor to Rochester Manufacturing Co., Inc., Rochester, N. Y., a corporation of New York Application November 30, 1942, Serial No. 467,404

17 Claims. (Cl. 177—351)

This invention relates to improvements in electrical mechanism for remote indication of movement, with particular reference to structures to be used on aircraft for giving a reading on the instrument panel to the pilot of engine oil pressure, fuel volume, position of landing wheels, wing flaps, or other condition at a distant point, and it has for its principal object to afford a practical, efficient, light weight mechanism of extreme simplicity and low manufacturing cost that can be readily installed and easily serviced.

Various structures are available for indicating remote conditions on aircraft such as the "Selsyn" and "Autosyn" systems, but such apparatus as is now in use requires a multiplicity of conductors between the operating mechanism and the indicator in addition to being costly to produce and install, and it is a particular object of the invention to afford a structure that requires only a single conductor between the operating and indicating mechanisms, and one in which the operating mechanism is of such compactness and light weight that it can be mounted directly on an engine for oil pressure indications, thus eliminating the necessity of a separate mounting and intermediate tubular connections between the engine and pressure actuated element such as required in other systems.

Remote indications have also been obtained through the instrumentality of a sliding contact resistance controlling an electric indicator, but this type of apparatus is objectionable because it is characterized by errors due to the voltage variations present in aircraft controlling circuits while the sliding contact introduces an inaccuracy due to the extreme changes of ambient temperature, and it is a further purpose of the invention to obviate such objections by the use of apparatus that does not depend on the functioning of a sliding contact resistance and which effectively compensates for voltage variations in the controlling circuit.

More particularly, the invention has for its object to afford mechanism employing an A. C. ground return system with only a single conductor between the operating and indicating mechanisms and having provision for automatically compensating for voltage changes in the controlling circuit so that a substantially correct reading of oil pressure or other remote condition is always assured regardless of usual voltage changes in the operating circuit.

Another purpose of the invention is to afford a structure that can be operated with only a relatively small amount of current, thus making it especially adaptable to aircraft installations, and which is not measurably affected by wide or abrupt changes in ambient temperature, while being so rugged, light weight, and compact as to make possible its installation directly upon an aircraft engine without additional fittings or supports, for giving oil pressure readings.

A further object of the invention is to afford a structure of such relatively low cost that damaged parts can be replaced with new units economically without the necessity of attempting repairs, and one that enables the use of commercially available low cost instruments such as a standard A. C. milliammeter as the indicating mechanism.

An additional object of the invention is to afford mechanism in which a full scale movement of the indicator can be had either from a very slight motion of the prime mover or from a more extensive motion of the prime mover, and in which the instrument can be easily calibrated by readily controlled adjustments of air gaps between a movable armature and the cores with which it cooperates so as to vary the relative movement of the indicator at different portions of the scale and obtain exactly the desired character of scale in relation to the indicator, as for instance sensitive, or crowded, or uniform at any given portion.

Still another purpose of the invention is to afford an arrangement of parts that gives a zero reading of the indicator when the operating circuit is closed and the controlling mechanism in its initial position, while permitting the indicator to move to a sub-zero position when the controlling circuit is open or a conductor broken, thus giving to the pilot or operator a constant check on the system that enables him to determine at a glance whether the electric controlling circuit is closed and functioning.

In general, the invention as applied to aircraft includes an inverter for changing the battery direct current to alternating current, which is divided and carried through two conductors to primary and secondary coils, the secondary coil being wound oppositely to the primary coil and having more turns so that the current induced therein by magnetic flux created by the primary coil opposes the line current normally passing through the secondary coil, the primary coil being grounded and the secondary coil being connected to the electric current measuring instrument and thence to ground, and the amount of current passing through the secondary coil to the electric current measuring instrument being determined by an armature connected to the prime mover and operating to by-pass partially magnetic flux away from the core of the secondary coil and thus vary the line current passing through the secondary coil in accordance with variations in the position of the prime mover.

To these and other ends, the invention consists in the construction and arrangement of parts that will appear clearly from the following description when read in conjunction with the accompanying drawing, the novel features being pointed out in the claims following the specification.

In the drawing:

Fig. 5 is a diagrammatic view of a modified form, adapted for use where greater motion of the prime mover must be provided for.

Figure 1:
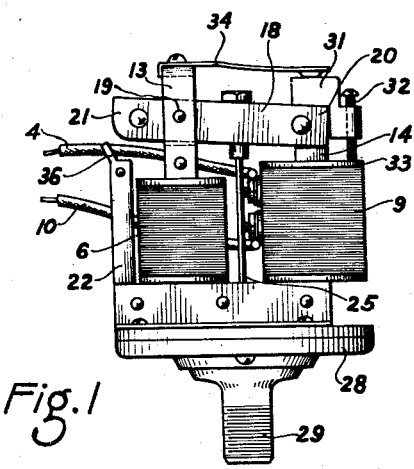
Fig. 1 is a side elevation of a mechanism constructed in accordance with one practical embodiment of the invention.
Figure 2:
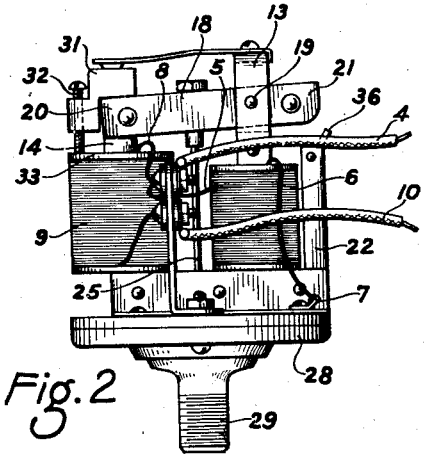
Fig. 2 is a side elevation of the same looking in the opposite direction.
Figure 3:
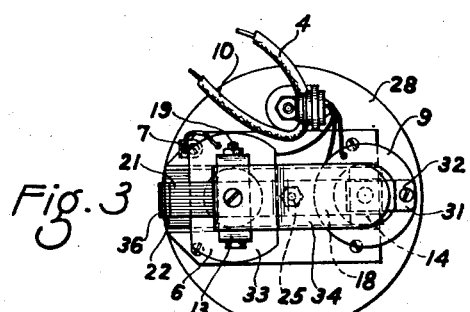
Fig. 3 is a plan view of the same.

Referring more particularly to the drawing in which like reference numerals refer to the same parts throughout the several views, Figs. 1 to 4 inclusive disclose an arrangement adapted for aircraft installations where a battery direct current is available, although it will be understood that the apparatus can be used in any relation where a relatively low voltage alternating current is present, and in the structure referred to, 1 is a conventional 24-volt aircraft battery, 2 is an inverter for changing the battery direct current to A. C. current of for instance 26 volts and 400 cycles, while 3 is a manual switch for controlling the battery circuit.

The A. C. current is carried from the inverter 2 through a conductor 4 that is divided into two branches, conductor 5 leading to the primary coil 6 and thence to ground at 7, and conductor 8 leading to the secondary coil 9. From the secondary coil 9 a single conductor 10 leads to the indicating mechanism, which may be a commercially available electric current measuring instrument such as a conventional iron vane type A. C. milliammeter having a zero to 50 scale, as shown at 11 and connected to ground at 12.

The primary and secondary coils 6 and 9 form part of the operating mechanism which includes a plurality of cores 13 and 14 arranged parallel to each other, the core 13 being of greater length than the core 14 and connected thereto at one end by the bridge portion 15. The secondary coil 9 is wound on its core 14 in a reverse direction to that of the primary coil 6 and has approximately ten per cent more turns than coil 6, as a result of which the magnetic flux set up by the primary coil 6 induces an electromotive force in the secondary coil 9 that is opposed to the line current normally traveling through secondary coil 9 from conductor 8.

The relation of the coils 6 and 9 is such that when the parts are in initial position, as will appear more fully presently, the induced opposing electromotive force in secondary coil 9 is sufficient to nearly but not entirely neutralize the line current normally passing through conductor 8 and thus to permit only a very small amount of current to pass through to the measuring instrument sufficiently to hold the indicator 17 in zero position. If the battery switch 3 is opened or there should be a break in the line, no current passes to the measuring instrument 11, and indicator 17 drops back to a sub-zero position as shown by dotted lines. Movements of the indicator 17 are effected by varying the induced opposing current in secondary coil 9 and thus correspondingly varying the amount of line current passing through coil 9 to the measuring instrument 11, and the particular mechanism by which this result is attained will now be described.

18 designates an armature pivotally mounted at 19 on the core 13 and having one end 20 extending over the core 14 while its opposite end 21 extends over a flux arm 22 that is connected to core 13 by a bridge portion 23. The cores 13 and 14, flux arm 22, connecting bridge portions 15 and 23 and armature 18 are formed of laminated transformer soft sheet steel or other suitable material. 25 designates a rod attached to the armature 18 at a point between the cores 13 and 14 and extending parallel thereto through an opening 26 in the bridge portion 15 while its opposite end is connected to the prime mover which in the structure shown in Figs. 1 to 4 is a pressure diaphragm 27 arranged within a housing 28, see Figs. 1 and 2, and forming part of a conventional pressure gauge for showing engine oil pressure. The parts just described are mounted on the housing 28 which carries the conventional threaded connection 29 by means of which the housing and operating mechanism may be mounted directly upon the engine whose oil pressure is to be indicated, but it will be understood that the rod 25 may be suitably connected to and actuated by any prime mover forming part of a mechanism whose movements are to be indicated at the remote point.

In initial position, the end 20 of armature 18 is separated from the adjacent end of core 14 by a slight air gap which is adjustable, and to this end, the armature is provided with a bracket or support 31 that carries a threaded adjusting pin 32 engageable with the insulating end plate 33 of the coil 9, and the armature is held against the core 14, or returned to such position when released by the prime mover, by means of a leaf spring 34 secured to the outer end of core 13 and having its free end engaging the bracket 31 or the end 20 of the armature.

Figure 4:
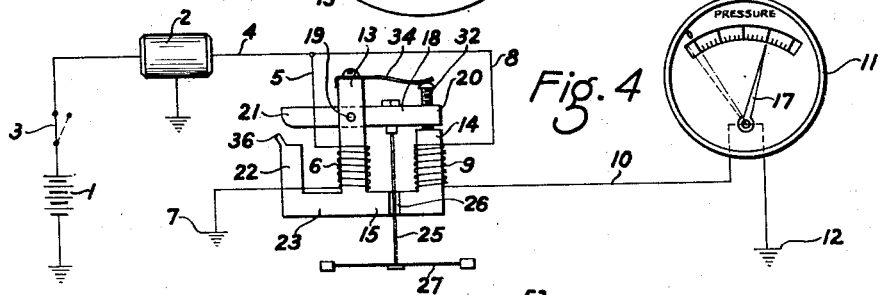
Fig. 4 is a diagrammatic view showing the circuit arrangement for the construction appearing in Fig. 1.

The opposite end 21 of the armature is normally spaced substantially from the flux arm 22 and when the parts are in initial position as shown in Fig. 4, the alternating magnetic flux traveling through armature 18, bridge portion 15, and core 14 is sufficient to induce an opposing electromotive force in the secondary coil sufficient to prevent any substantial line current passing therethrough to the measuring instrument and to permit only enough current passing to hold the indicator 17 at zero position, but when the end 20 of the armature is moved away from core 14 by the pressure diaphragm or prime mover 27 and rod 25, the opposite end 21 of the armature approaches the flux arm 22, the air gap between these parts being thereby lessened, and thus causing a partial by-passing of magnetic flux from the end 21 of the armature to the flux arm 22 and away from the core 14. This reduces the magnetic flux through core 14 and correspondingly lessens the opposing current induced therein, permitting a greater amount of line current from the conductor 8 to travel through the secondary coil 9 and to the measuring instrument 11 so as to give in terms of electrical measurement of the current passing through coil 6 a constant indication of the position of the prime mover.

The flux arm 22 is provided with an adjustable ear 36 that can be readily bent to vary the air gap at this point and thus facilitate calibrating the instrument. The indicator scale of instrument 11 carries suitable indicia for showing pressure or other condition, and by adjusting the air gaps before described, also by selecting the proper pivotal point for the armature, any desired movement of the indicator can be obtained over a given portion of the scale so as to give a uniform reading throughout the entire path of movement of the indicator, or a more sensitive or delicate reading at one point of the scale than another, and movement of the indicator in relation to the scale and given portions thereof can be further regulated by determining the shape of the end 21 of the armature adjacent to the flux arm 22.

Changing the pivotal point 19 of the armature in relation to core 13 and rod 25 enables determining to a nicety the leverage relation between the prime mover and the pivoted armature and the amount of travel required by the prime mover to move the armature at various points throughout the range of the indicator, thus enabling control of the indicator movements in relation to the scale, while the magnetic flux movement is controlled by adjustment of the air gaps as previously described.

Movement of the indicator 17 and of current traveling in conductor 10 is practically unaffected by the usual changes in voltage in the battery circuit since any change in voltage of line current traveling through conductor 5 and primary coil 6 will be similarly reflected in the counter-electromotive force set up in secondary coil 9. Consequently any normal increase or decrease in line voltage in conductor 8, which is necessarily the same as in conductor 5, is substantially offset or neutralized by a similar increase or decrease of voltage in counter-electromotive force set up in secondary coil 9 by magnetic flux. For instance, on an aircraft installation for pressure indication with a battery inverter circuit, a change from 22 volts to 28.5 volts D. C. in the battery circuit caused less than one milliampere error in the indicator reading on a zero to fifty scale, iron vane type, A. C. milliammeter.

The net result is that the line current traveling through coil 9, conductor 10, and the electric current measuring instrument 11 is always a substantially true indication of the difference between the counter-electromotive force in coil 9 and the line voltage in conductor 8, irrespective of the usual changes in voltage of the A. C. line, since any variation in the voltage of the line current in primary coil 6 is effective in both directions in coil 9, and the increase or decrease in the induced counter-electromotive force is substantially equal to any increase or decrease in the line current.

Figure 5:
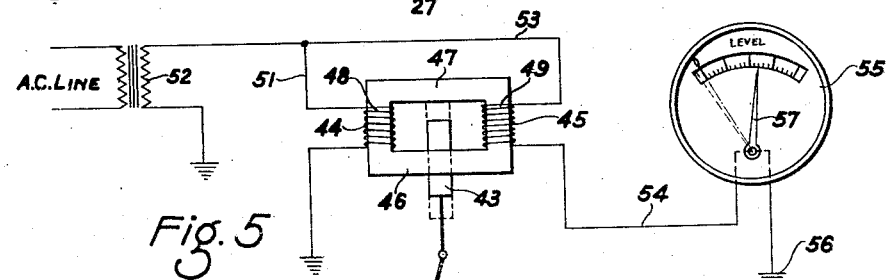

Fig. 5 discloses a modification that is adapted for operations where the prime mover travels through a greater distance as for instance when indicating level of liquid in a tank and for any A. C. line. In this instance, the prime mover is in the form of a connecting rod 41 operated by a float rod 42, the position of which is determined by the level of liquid in a tank, while 43 designates an armature slidably arranged between and parallel to the cores 44 and 45 which are connected at their ends by bridge portions 46 and 47. 48 designates a primary coil surrounding core 44 and 49 a secondary coil surrounding core 45.

Coil 48 is connected by conductor 51 to an A. C. line which may include a transformer 52 to reduce the voltage, and the opposite end of coil 48 is connected to ground, while coil 49 is connected at one end to the conductor 53 leading to the same A. C. line as conductor 51, and at its opposite end to conductor 54 which leads to the electric current measuring instrument 55, the latter being connected to ground at 56. The indicator 57 is movable in the same manner as previously described with reference to indicator 17 and the scale on instrument 55 is suitably marked to give liquid level indications.

The operation and functioning of the primary and secondary coils in relation to the line current is the same as the structure illustrated in Figs. 1 to 4, and armature 43 may be provided with suitable means for adjustably varying the air gap between it and the bridge portion 47 to calibrate the instrument. It will be understood that as armature 43 approaches the bridge portion 47, the magnetic flux set up by primary coil 48 is by-passed partially away from coil 49 through armature 43 and bridge portions 46 and 47, thus permitting more line current to pass through coil 49 to the measuring instrument 55. The operation is in principle the same as already described, the main difference being that a slidable armature is used in place of a pivoted armature while the flux arm of the Fig. 4 construction is omitted and the cores connected at both ends by bridge portions.

While the invention has been described with reference to certain specific embodiments, it is not confined to the details or particular arrangements herein disclosed, and this application is intended to cover such further modifications and departures as may come within the purposes of the invention or the scope of the following claims.

I claim:

1. Electrical mechanism for remote indication of movement including a source of alternating current, a plurality of cores connected together, a primary coil surrounding one of said cores, said coil being connected at one end to said source of alternating current and at its opposite end to ground, a secondary coil surrounding the other of said cores and wound in a direction opposite to the first mentioned coil, said secondary coil being connected at one end to said source of alternating current whereby the current induced in the secondary coil by magnetic flux opposes the line current, an electric current measuring instrument connected to the other end of the secondary coil and to ground, an armature movable relatively to said cores and operable to partially by-pass magnetic flux away from the core of the secondary coil and thus vary the line current passing through the secondary coil to the measuring instrument, and a prime mover connected to said armature.

2. Electrical mechanism for remote indication of movement including a source of alternating current, a plurality of cores connected together, a primary coil surrounding one of said cores, said coil being connected at one end to said source of alternating current and at its opposite end to ground, a secondary coil surrounding the other of said cores and wound in a direction opposite to the first mentioned coil, said secondary coil being connected at one end to said source of alternating current whereby the current induced in the secondary coil by magnetic flux opposes the line current, an electric current measuring instrument connected to the other end of the secondary coil and to ground, a flux arm connected at one end to said cores, an armature pivotally supported on the core of the primary coil with one end initially in close relation to the core of the secondary coil and its opposite end spaced substantially from said flux arm, the armature operating when moved to partially by-pass magnetic flux away from the core of the secondary coil through said flux arm and thus vary the line current passing through the secondary coil to the measuring instrument, and a prime mover connected to said armature.

3. Electrical mechanism for remote indication of movement on aircraft including a battery, an inverter connected to the battery and acting to change the direct current therefrom into alternating current, a conductor leading from the inverter, a plurality of cores connected together, a primary coil surrounding one of said cores, said coil being connected at one end to said conductor and at its opposite end to ground, a secondary coil surrounding the other of said cores and wound in a direction opposite to the first mentioned coil, said secondary coil being connected at one end to said conductor whereby the current induced in the secondary coil by magnetic flux opposes the line current, an electric current measuring instrument connected to the other end of the secondary coil and to ground, an armature movable relatively to said cores and operable to partially by-pass magnetic flux away from the core of the secondary coil and thus vary the line current passing through the secondary coil to the measuring instrument, and a prime mover connected to said armature.

4. Electrical mechanism for remote indication of movement on aircraft including a battery, an inverter connected to the battery and acting to change the direct current therefrom into alternating current, a conductor leading from the inverter, a plurality of cores connected together, a primary coil surrounding one of said cores, said coil being connected at one end to said conductor and at its opposite end to ground, a secondary coil surrounding the other of said cores and wound in a direction opposite to the first mentioned coil, said secondary coil being connected at one end to said conductor whereby the current induced in the secondary coil by magnetic flux opposes the line current, an electric current measuring instrument connected to the other end of the secondary coil and to ground, a flux arm connected at one end to said cores, an armature pivotally supported on the core of the primary coil with one end initially in close relation to the core of the secondary coil and its opposite end spaced substantially from said flux arm, the armature operating when moved to partially by-pass magnetic flux away from the core of the secondary coil through said flux arm and thus vary the line current passing through the secondary coil to the measuring instrument, and a prime mover connected to said armature.

5. Electrical mechanism for remote indication of movement including a source of alternating current, a plurality of cores connected together, a primary coil surrounding one of said cores, said coil being connected at one end to said source of alternating current and at its opposite end to ground, a secondary coil surrounding the other of said cores, an electric current measuring instrument connected to said secondary coil and to ground, an armature movable relatively to said cores and operable to partially by-pass magnetic flux away from the core of the secondary coil and thus vary the line current passing through the secondary coil to the measuring instrument, and a prime mover connected to said armature.

6. Electrical mechanism for remote indication of movement including a source of alternating current, a plurality of cores connected together, a primary coil surrounding one of said cores, said coil being connected at one end to said source of alternating current and at its opposite end to ground, a secondary coil surrounding the other of said cores, an electric current measuring instrument connected to said secondary coil and to ground, a flux arm connected at one end to said cores, an armature pivotally supported on the core of the primary coil with one end initially in close relation to the core of the secondary coil and its opposite end spaced substantially from said flux arm, the armature operating when moved to partially by-pass magnetic flux away from the core of the secondary coil through said flux arm and thus vary the line current passing through the secondary coil to the measuring instrument, and a prime mover connected to said armature.

7. Electrical mechanism for remote indication of movement on aircraft including a battery, an inverter connected to the battery and acting to change the direct current therefrom into alternating current, a conductor leading from the inverter, a plurality of cores connected together, a primary coil surrounding one of said cores, said coil being connected at one end to said conductor and at its opposite end to ground, a secondary coil surrounding the other of said cores, an electric current measuring instrument connected to said secondary coil and to ground, an armature movable relatively to said cores and operable to partially by-pass magnetic flux away from the core of the secondary coil and thus vary the line current passing through the secondary coil to the measuring instrument, and a prime mover connected to said armature.

8. Electrical mechanism for remote indication of movement on aircraft including a battery, an inverter connected to the battery and acting to change the direct current therefrom into alternating current, a conductor leading from the inverter, a plurality of cores connected together, a primary coil surrounding one of said cores, said coil being connected at one end to said conductor and at its opposite end to ground, a secondary coil surrounding the other of said cores, an electric current measuring instrument connected to said secondary coil and to ground, a flux arm connected at one end to said cores, an armature pivotally supported on the core of the primary coil with one end initially in close relation to the core of the secondary coil and its opposite end spaced substantially from said flux arm, the armature operating when moved to partially by-pass magnetic flux away from the core of the secondary coil through said flux arm and thus vary the line current passing through the secondary coil to the measuring instrument, and a prime mover connected to said armature.

9. Electrical mechanism for remote indication of movement including a source of alternating current, a plurality of cores connected together, a primary coil surrounding one of said cores, said coil being connected at one end to said source of alternating current and at its opposite end to ground, a secondary coil surrounding the other of said cores and wound in a direction opposite to the first mentioned coil, said secondary coil being connected at one end to said source of alternating current whereby the current induced in the secondary coil by magnetic flux opposes the line current, an electric current measuring instrument connected to the other end of the secondary coil and to ground, a flux arm connected at one end to said cores, an armature pivotally supported on the core of the primary coil with one end initially in close relation to the core of the secondary coil and its opposite end spaced substantially from said flux arm, spring means holding the armature in its initial position, means permitting adjustment of the air gaps between the ends of the armature and the core of the secondary coil and said flux arm respectively, the armature operating when moved to partially by-pass magnetic flux away from the core of the secondary coil through said flux arm and thus vary the line current passing through the secondary coil to the measuring instrument, and a prime mover connected to said armature.

10. Electrical mechanism for remote indication of movement including a source of alternating current, a plurality of cores connected together, a primary coil surrounding one of said cores, said coil being connected at one end to said source of alternating current and at its opposite end to ground, a secondary coil surrounding the other of said cores and wound in a direction opposite to the first mentioned coil, said secondary coil being connected at one end to said source of alternating current whereby the current induced in the secondary coil by magnetic flux opposes the line current, an electric current measuring instrument connected to the other end of the secondary coil and to ground, a flux arm connected at one end to said cores, an armature pivotally supported on the core of the primary coil with one end initially in close relation to the core of the secondary coil and its opposite end spaced substantially from said flux arm, spring means holding the armature in its initial position, a stop adjustably supported at one end of the armature and positionable to vary the air gap between the armature and the core of the secondary coil, means permitting adjustment of the air gap between the opposite end of the armature and the flux arm, the armature operating when moved to partially by-pass magnetic flux away from the core of the secondary coil through said flux arm and thus vary the line current passing through the secondary coil to the measuring instrument, and a prime mover connected to the armature at the point between the primary and secondary coils.

11. Electrical mechanism for remote indication of movement including a source of alternating current, a plurality of cores connected together, a primary coil surrounding one of said cores, said coil being connected at one end to said source of alternating current and at its opposite end to ground, a secondary coil surrounding the other of said cores and wound in a direction opposite to the first mentioned coil, said secondary coil being connected at one end to said source of alternating current whereby the current induced in the secondary coil by magnetic flux opposes the line current, an electric current measuring instrument connected to the other end of the secondary coil and to ground, an armature movable relatively to said cores and operable to partially by-pass magnetic flux away from the core of the secondary coil and thus vary the line current passing through the secondary coil to the measuring instrument, and a prime mover connected to said armature, the secondary coil having more turns than the primary coil and operating when the armature is in its initial position to permit passage of only so much current to the electric current measuring instrument as will maintain the indicator at "zero" position.

12. Electrical mechanism for remote indication of movement including a source of alternating current, a plurality of cores connected together, a primary coil surrounding one of said cores, said coil being connected at one end to said source of alternating current and at its opposite end to ground, a secondary coil surrounding the other of said cores and wound in a direction opposite to the first mentioned coil, said secondary coil being connected at one end to said source of alternating current whereby the current induced in the secondary coil by magnetic flux opposes the line current, an electric current measuring instrument connected to the other end of the secondary coil and to ground, a flux arm connected at one end to said cores, an armature pivotally supported on the core of the primary coil with one end initially in close relation to the core of the secondary coil and its opposite end spaced substantially from said flux arm, the armature operating when moved to partially by-pass magnetic flux away from the core of the secondary coil through said flux arm and thus vary the line current passing through the secondary coil to the measuring instrument, and a prime mover connected to said armature, the secondary coil having more turns than the primary coil and operating when the armature is in its initial position to permit passage of only so much current to the electric current measuring instrument as will maintain the indicator at "zero" position.

13. Electrical mechanism for remote indication of movement on aircraft including a battery, an inverter connected to the battery and acting to change the direct current therefrom into alternating current, a conductor leading from the inverter, a plurality of cores connected together, a primary coil surrounding one of said cores, said coil being connected at one end to said conductor and at its opposite end to ground, a secondary coil surrounding the other of said cores and wound in a direction opposite to the first mentioned coil, said secondary coil being connected at one end to said conductor whereby the current induced in the secondary coil by magnetic flux opposes the line current, an electric current measuring instrument connected to the other end of the secondary coil and to ground, an armature movable relatively to said cores and operable to partially by-pass magnetic flux away from the core of the secondary coil and thus vary the line current passing through the secondary coil to the measuring instrument, and a prime mover connected to said armature, the secondary coil having more turns than the primary coil and operating when the armature is in its initial position to permit passage of only so much current to the electric current measuring instrument as will maintain the indicator at "zero" position.

14. Electrical mechanism for remote indication of movement on aircraft including a battery, an inverter connected to the battery and acting to change the direct current therefrom into alternating current, a conductor leading from the inverter, a plurality of cores connected together, a primary coil surrounding one of said cores, said coil being connected at one end to said conductor and at its opposite end to ground, a secondary coil surrounding the other of said cores and wound in a direction opposite to the first mentioned coil, said secondary coil being connected at one end to said conductor whereby the current induced in the secondary coil by magnetic flux opposes the line current, an electric current measuring instrument connected to the other end of the secondary coil and to ground, a flux arm connected at one end to said cores, an armature pivotally supported on the core of the primary coil with one end initially in close relation to the core of the secondary coil and its opposite end spaced substantially from said flux arm, the armature operating when moved to partially by-pass magnetic flux away from the core of the secondary coil through said flux arm and thus vary the line current passing through the secondary coil to the measuring instrument, and a prime mover connected to said armature, the secondary coil having more turns than the primary coil and operating when the armature is in its initial position to permit passage of only so much current to the electric current measuring instrument as will maintain the indicator at "zero" position.

15. Electrical mechanism for remote indication of movement on aircraft including a battery, an inverter connected to the battery and acting to change the direct current therefrom into alternating current, a conductor leading from the inverter, two parallel spaced cores and a parallel spaced flux arm connected together at one end, a primary coil surrounding the core adjacent to the flux arm and connected at one end to said conductor and at its opposite end to ground, a secondary coil surrounding the other of said cores, said secondary coil having more turns than the primary coil and wound in the opposite direction, the secondary coil being connected at one end to said conductor whereby the current induced in the secondary coil by magnetic flux opposes the line current, an electric current measuring instrument connected to the other end of the last mentioned coil and to ground, a spring-controlled armature pivoted on the core of the primary coil with one end initially in close relation to the core of the secondary coil and its opposite end substantially spaced from the flux arm, means permitting adjustment of the air gaps between the ends of the armature and the adjacent core and flux arm, and a prime mover connected to the armature at a point between the primary and secondary coils.

16. Electrical mechanism for remote indication of movement on aircraft including a battery, an inverter connected to the battery and acting to change the direct current therefrom into alternating current, a conductor leading from the inverter, a housing positionable on the aircraft engine, a prime mover in the housing operable by engine oil pressure, an electric current measuring instrument, and mechanism mounted on said housing for operating the measuring instrument, said mechanism comprising a plurality of cores connected together, a primary coil surrounding one of said cores, said coil being connected at one end to said conductor and at its opposite end to ground, a secondary coil surrounding the other of said cores and wound in a direction opposite to the primary coil, said secondary coil being connected at one end to said conductor whereby the current induced in the secondary coil by magnetic flux opposes the line current, said measuring instrument being connected to said secondary coil and to ground, an armature movable relatively to said cores and operable to partially by-pass magnetic flux away from the core of the secondary coil and thus vary the line current passing through the secondary coil to the measuring instrument, and a connection between said armature and the prime mover.

17. Electrical mechanism for remote indication of movement including a source of alternating current, a pair of parallel spaced cores connected together at their ends, a primary coil surrounding one of said cores, said coil being connected at one end to said source of alternating current and at its opposite end to ground, a secondary coil surrounding the other of said cores and connected at one end to said source of alternating current, said secondary coil having more turns than the primary coil and wound in the opposite direction to oppose the line current, an electric current measuring instrument connected to the other end of the secondary coil and to ground, an armature slidably mounted between the coils and movable in a direction parallel thereto to variably by-pass magnetic flux away from the core of the secondary coil whereby to cause a variable current flow to the current measuring instrument, and a prime mover connected to said armature.

WILLIAM B. CONNOLLY.